United States Patent
Mach

(10) Patent No.: US 8,147,326 B2
(45) Date of Patent: Apr. 3, 2012

(54) SECURED INTER-PROCESSOR AND VIRTUAL DEVICE COMMUNICATIONS SYSTEM

(75) Inventor: Ronald Edward Mach, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 783 days.

(21) Appl. No.: 11/095,097

(22) Filed: Mar. 30, 2005

(65) Prior Publication Data

US 2005/0172101 A1 Aug. 4, 2005

Related U.S. Application Data

(63) Continuation of application No. 09/701,168, filed as application No. PCT/AU99/00389 on May 21, 1999, now Pat. No. 7,093,040.

(60) Provisional application No. 60/086,632, filed on May 23, 1998.

(51) Int. Cl.
  A63F 9/24 (2006.01)
  A63F 13/00 (2006.01)
(52) U.S. Cl. ............... 463/29; 463/16; 463/20; 463/25; 463/42
(58) Field of Classification Search .............. 463/16, 463/20, 29, 40–42; 16/16, 20, 29, 40–42
See application file for complete search history.

(56) References Cited

U.S. PATENT DOCUMENTS

| | | | | |
|---|---|---|---|---|
| 4,240,635 A | * | 12/1980 | Brown | 463/20 |
| 4,933,938 A | * | 6/1990 | Sheehy | 370/401 |
| 5,508,940 A | * | 4/1996 | Rossmere et al. | 715/723 |
| 5,643,086 A | * | 7/1997 | Alcorn et al. | 463/29 |
| 5,725,428 A | * | 3/1998 | Achmuller | 463/20 |
| 5,758,099 A | * | 5/1998 | Grieco et al. | 710/301 |
| 5,832,277 A | * | 11/1998 | Sullivan et al. | 710/241 |
| 5,851,149 A | * | 12/1998 | Xidos et al. | 463/42 |
| 5,892,972 A | * | 4/1999 | Narahari et al. | 710/8 |
| 6,023,585 A | * | 2/2000 | Perlman et al. | 717/178 |
| 6,106,396 A | * | 8/2000 | Alcorn et al. | 463/29 |
| 6,189,050 B1 | * | 2/2001 | Sakarda | 710/18 |
| 6,219,836 B1 | * | 4/2001 | Wells et al. | 717/178 |
| 6,645,077 B2 | * | 11/2003 | Rowe | 463/42 |
| 6,905,411 B2 | * | 6/2005 | Nguyen et al. | 463/25 |
| 7,367,889 B2 | * | 5/2008 | Canterbury | 463/43 |
| 2002/0138594 A1 | * | 9/2002 | Rowe | 709/219 |
| 2002/0195773 A1 | * | 12/2002 | Dunn | 273/274 |
| 2003/0008704 A1 | * | 1/2003 | Gauselmann | 463/20 |
| 2003/0162591 A1 | * | 8/2003 | Nguyen et al. | 463/29 |

OTHER PUBLICATIONS

"Readme.toplevel", Nov. 12, 1997 <retrieved from Internet Jun. 22, 2008>, http://stuff.mit.edu/afs/sipb/contrib/doc/Pnp/readme.toplevel.*

Intel and Microsoft Corporation, "Plug and Play ISA specification", May 5, 1994, Release 1.0a, see entire document.*

"Compensating for moderate effective throughput at the desktop" by Orphanos et al. (abstract only) Publication Date: Apr. 2000.

* cited by examiner

*Primary Examiner* — Dmitry Suhol
*Assistant Examiner* — Ryan Hsu
(74) *Attorney, Agent, or Firm* — McAndrews, Held & Malloy, Ltd.

(57) ABSTRACT

The invention comprises an electronically secured inter-processor and virtual device communications system, with an input/output controller board, a multi-drop bus interface to multiple devices, and a parallel interface to an industry standard single board computer. The invention assigns a bus address and virtual identification number to each device and controls communications between the main central processing unit and the devices through a Plug-n-Play protocol.

5 Claims, 11 Drawing Sheets

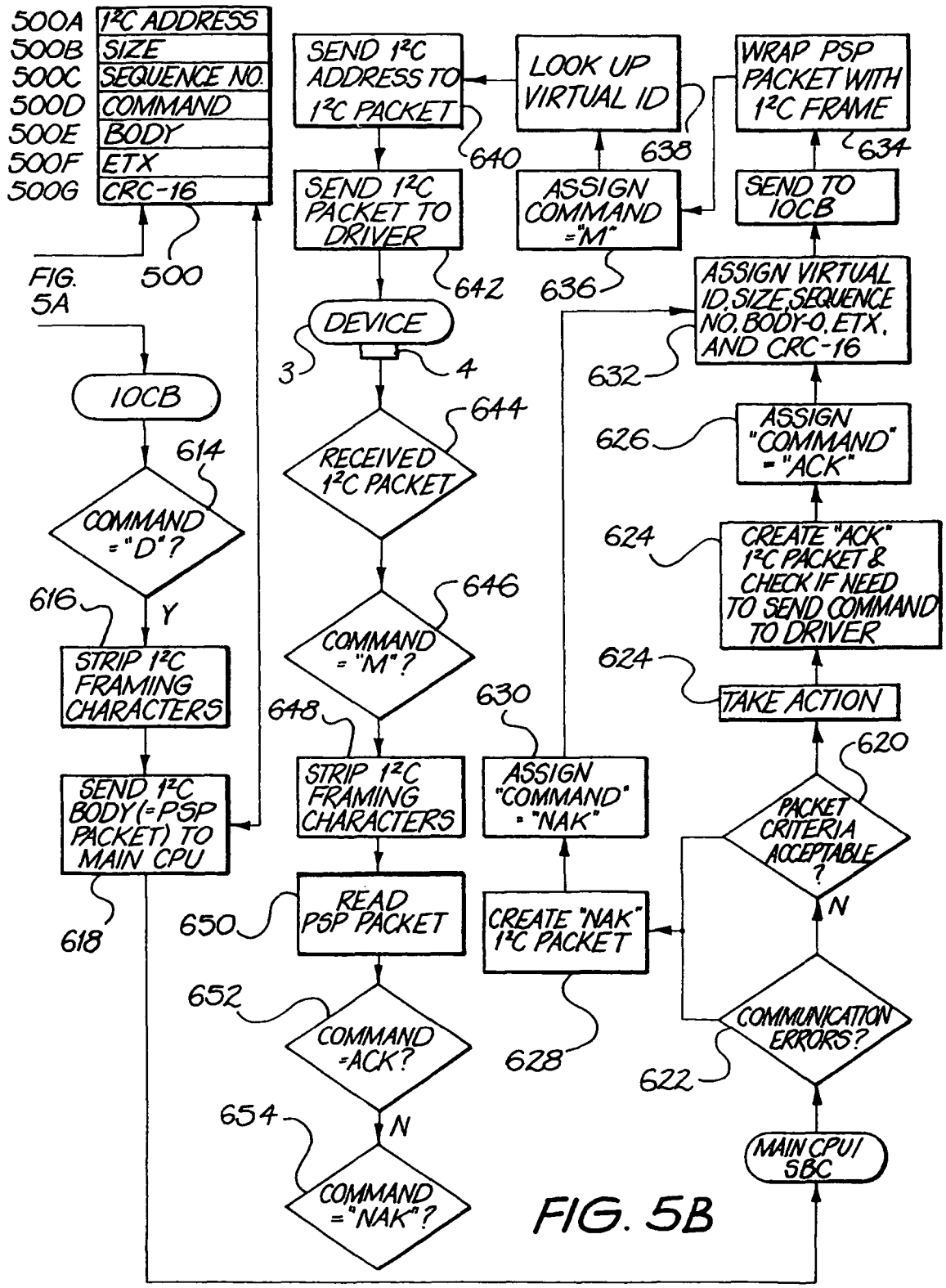

SECURED INTER-PROCESSOR AND VIRTUAL DEVICE COMMUNICATIONS SYSTEM

CROSS REFERENCE TO RELATED APPLICATIONS

This is a continuation of Ser. No. 09/701,168, filed on Oct. 20, 2003, now U.S. Pat. No. 7,093,040 as a 371 of International Application No. PCT/AU99/00389, filed on May 21, 1999, and claims benefit to provisional application No. 60/086,632 filed May 23, 1998.

FIELD OF THE INVENTION

The present invention is directed generally to an electronically secured inter-processor and virtual device communication system used in gaming machines and is directed more particularly to an electronically secured inter-processor and virtual device communications system with (1) an Input/Output Controller Board (hereinafter referred to as "IOCB"), (2) a multi-drop bus interfacing one or more device modules, (3) a parallel interface to an industry standard main single board computer (hereinafter referred to as the "SBC") of the gaming machine and (4) a IOCB-to-device "Plug-N-Play protocol (the "Plug-N-Play Protocol").

BACKGROUND OF THE INVENTION

Conventional methods of integrating a variety of components in a gaming machine currently require re-designing, re-wiring and reprogramming the gaming machine as each new component is added. As technology advances, newer state-of-the-art devices are being offered to manufacturers of gaming machines that would greatly enhance the product, but manufacturers are inhibited, as removing and replacing the old devices with new devices, or simply adding the new device requires reprogramming the SBC and could require the re-design and/or replacement of the SBC.

The industry standard SBC board, independent of the microprocessor used, has been designed using discrete components with EPROM memory chips containing software with an individual bus connected to each device. As most of the gaming machines in the market require some sort of regulatory approval, modifying a previously approved product requires a re-submittal to the regulatory agency with the re-submittal emphasizing recertification of the programming of the new device in the CPU. With the software for each device residing in the EPROM, this requires reverification of the entire program.

Especially for manufacturers with a significant installed base of gaming machines, retrofitting these machines with a newer device is an expensive proposition and a logistical nightmare. Utilising a 'Plug-N-Play' concept, the Invention, through the Input/Output Controller Board (IOCB), logically interconnects all the devices in the gaming machine to the SBC. The IOCB's communications to and from each device is based on a network-capable communications protocol, such as Philips' Inter-Integrated Circuit ($I^2C$) two-wire Serial Interface (hereinafter "PHILIPS $I^2C$").

As the IOCB logically interconnects the modules or potential modules to the SBC, the SBC and its EPROM memory chips do not have to be reprogrammed, resigned or replaced. Further, as no device related software resides on the SBC or its EPROMS, no new software needs to be resubmitted to any regulatory agency, as no new software is created. Instead each device in the machine incorporates an intelligent board with microprocessor (the "Device Board") which is programmed specifically to the functions of that device. The Device Board also communicates via the communications protocol, such as PHILIPS $I^2C$, to the IOCB in a multi-drop configuration. Replacing a device or adding a new device is simply a matter of connecting the communications interface (Clock, Data, Logic Power, System Ground) to the multi-drop bus interconnecting all the devices to the IOCB.

The IOCB programming module continuously monitors the communications protocol interface (the PHILIPS $I^2C$ line) for device activity and relays these actions to and from the SBC. As new devices are added to the link, a specific registration protocol is followed which will allow the device to register with the IOCB. If the registering device has followed all the secured protocols, the specific parameters of the device (device type, Serial Number, etc.) are relayed to the SBC.

The SBC has several modules programmed for all possible devices that may connect to the machine, such as a Coin In, Coin Out, and Bill Acceptor modules. Even though there may be several types of these devices, the appropriate SBC module simply monitors for coins in, coins out and bills accepted. The specific hardware and protocol of each connected device is level converted and formatted by each Device Board to a generic format required by the SBC module.

Accordingly, an object of the invention is an electronically secured inter-processor and virtual device communication system which allows devices to be added to, replaced in or changed in a gaming machine without any need to reprogram or redesign the SBC of the gaming machine.

A further object of the invention is an electronically secured inter-processor and virtual device communication system which allows devices to be added, replaced in, or changed in a gaming machine without a need to replace the SBC of the gaming machine.

An additional object of the invention is an electronically secured inter-processor and virtual device communication system which allows devices to be added to, changed in, or replaced in a gaming machine without the need to modify the software residing in the CPU or any device so that a resubmittal to an appropriate regulatory body would not be necessary.

Still another object of the invention is an electronically secured inter-processor and virtual device communication system which cost-effectively allows devices to be changed in a gaming machine.

Furthermore, an object of the invention is an electronically secured inter-processor and virtual device communication system which allows devices to most efficiently be added to, replaced in or changed in a gaming machine.

An additional object of the invention is an electronically secured inter-processor and virtual device communication system with a protocol which supports dynamic assignment of device addresses.

Still a further object of the invention is an electronically secured inter-processor and virtual device communication system which provides reliable and secure communications among interprocessors.

SUMMARY OF THE INVENTION

These and other objects of the invention, which shall become apparent hereafter, are achieved by providing an electronically secured inter-processor and virtual device communication system, including an IOCB connecting a multitude of peripheral gaming machine devices and the SBC through parallel interface. In an embodiment, the IOCB provides an interface between the SBC of the gaming machine and the machine's devices and is connected to the SBC through a parallel interface. The IOCB uses a multi-drop communication bus for its connection with the devices requiring at least four wires for the clock, data, logic power, and system ground protocol. Each device contains its own CPU board programmed for the specific device. When power is first applied to the gaming machine, the IOCB attempts to establish a link with the SBC by placing a 'link request' transaction in the IOCB's transmit queue and commencing an idle state. The IOCB then remains in an idle state until the SBC acknowledges a physical connection. Once the SBC acknowledges a physical connection, the IOCB sends the 'link request' transaction to the SBC, preferably through the IOCB's Parallel Slave Port (Data) (the "PSP-Data"). When the link is established, the IOCB sends a framed packet to the SBC containing the Virtual ID and device registration commences. Independently of the SBC and the IOCB, each device's CPU attempts to register the device's hardware with the IOCB through the multi-drop bus. As the IOCB registers each device, the IOCB assigns an communications protocol address, preferably the PHILIPS I²C address, to the device and creates a device table entry containing data uniquely identifying the device, such as type of device, serial number, and the communications protocol address. As each device is registered, the SBC assigns and stores a virtual identification number (the "Virtual ID"). After all devices are registered, the IOCB stores information about each registered device and transfers any pertinent packets received from a device to the SBC.

In a preferred embodiment, the IOCB is the only external device interfacing the SBC with the gaming machine's devices such as Deck Buttons and Lamps, Coin In Mechanisms, Coin Out Hoppers, Bill Acceptors, Magnetic-Stripe Card Readers, Keypads, Progressive Display Interfaces, Ticket Printers, Coupon Dispensers, Hard Meters and general Security switches in the machine. The IOCB's physical connection to the SBC is preferably via a parallel interface on the SBC, preferably a PC-104 bus which is capable of transfer rates up to 8 million bytes per second. The data transfer between the IOCB and SBC is interrupt-driven and controlled by an 8-bit register.

The IOCB interfaces the listed devices through a Multi-Drop communication scheme using a network-capable communications protocol, such as RS-485, USB, current loop, or preferably Philips Corporation's two-wire Inter-Integrated Circuit (I²C) serial interface and corresponding communications protocol ("hereinafter "I²C protocol"), which enables speeds up to 400 kbps.

The communications protocol, preferably the I²C protocol, ensures reliable transmission and reception of data. When transmitting data, only one apparatus, preferably the IOCB, is the 'master' which initiates transfer on the bus and generates the clock signals to permit that transfer, while the other device(s) acts as the 'slaves'.

The Philips communication protocol ("I²C Protocol") operates on top of Philip's published industry standard I²C protocol. Additional information on the PHILIPS I²C specification can be obtained from the document "The I²C bus and how to use it", #939839340011, available from the Philips Corporation.

The communications protocol, preferably the I²C protocol, constitutes the physical layer for the invention's IOCB to Device 'Plug-N-Play' protocol, which is a packet-driven securitized protocol.

The preferably I²C framed 'Plug-N-Play' protocol supports dynamic assignment of I²C addresses, facilitates reliable communications between I²C devices and the IOCB and provides a secured link for inter-processor communications.

A multi-wire Multi-Drop bus, preferably a four-wire multi-drop bus (Clock, Data, Logic Power, System Ground), interconnects all devices throughout the machine to the IOCB. Each device is equipped with a firmware-based CPU board which is programmed to the specific parameters and purpose of each device. Each device's CPU board is capable of communicating with the communications protocol, preferably the I²C protocol.

Messages are routed to and from the IOCB to the devices using a communications protocol framed packet, preferably an I²C framed packet comprised of an I²C address, header, body and footer, as specified below.

To prevent statistical breakdown of the CRC-16, packets will be limited to a maximum of 255 bytes inclusive of the I²C Address and Footer. Message bodies larger than 248 bytes must be broken up into multiple communications protocol framed packets, preferably I²C framing packets.

When power is first applied to the gaming machine, the IOCB attempts to establish a link with the SBC by placing a 'link-request' transaction in the IOCB transmit queue, which commences an idle state. The IOCB remains in this idle state until the SBC acknowledges a physical connection. Upon receiving acknowledgment of the physical connection, the IOCB sends this link request transaction to the SBC via preferably the Parallel Slave Port (PSP Data) of the IOCB through a PSP-framed packet containing the Virtual ID of the device. Once the link is established, device registration begins. Neither the IOCB nor the SBC has knowledge of the devices integrated in the machine. Each device's CPU will attempt to 'register' its specific hardware with the IOCB by communication through the communications protocol multi-drop bus, preferably a I²C Multi-Drop bus. As each device is registered by the IOCB, the IOCB dynamically assigns a communications protocol address (range 9-76h), preferably an I²C address, to the device and enters the device information into a device table which stores the device's specific data (type of device, serial number, etc.). As long as power is applied to this device, a device responds to IOCB requests using this communications protocol address, such as an I²C address. The IOCB also assigns Virtual ID (Circuit Number) to the device referencing the device to the SBC. The SBC uses this Virtual ID to invoke a software driver referencing this device type regardless of its communications protocol, preferably I²C, address. The Virtual ID remains assigned to the device and, should the device lose power, upon re-registering, the device may receive a different communications protocol, preferably I²C, address but will maintain the same Virtual ID. This process repeats until all devices have been registered.

As each new device is dynamically registered, a table entry in the IOCB's device table is created for that device. As the IOCB is continuously polling these registered devices, the IOCB will detect removal of a device and will send notification to the SBC.

After device registration, utilising a prioritized polling scheme, the IOCB will query each registered device for status. The IOCB either receives a 'no activity' packet or a packet containing pertinent data for that device. If required, the IOCB transfers a valid packet to the SBC via preferably the PSP-Data port.

If a registered device fails to respond to its poll after a fixed number of retries, the IOCB declares the device 'inactive' by sending an appropriate PSP framed transaction to the SBC.

The IOCB communicates with the SBC via a parallel port connected to a PC-104 bus on a SBC. The interrupt-driven data transfer is controlled by a shared 8-bit register which is used as handshaking flags for flow control.

The communications protocol bus is a multi-wire communications interface, preferably a I²C bus with a two-wire serial interface developed by the Philips Corporation which enables speeds up to 400 kbps.

The IOCB will be interrupted by the PSP-Data if the SBC initiates any PSP framed transactions. If the SBC initiates a transaction, the IOCB will wrap the PSP framed characters with communications protocol framing characters, such as I²C framing characters, sending this data to the appropriate device at that communications protocol address.

In any setting, the IOCB's sole responsibility is to direct secured data transactions to and from the SBC and to and from the gaming machine's devices. The IOCB does not initiate or control any functions of the gaming machine.

BRIEF DESCRIPTION OF THE DRAWINGS

The invention would be better understood from the following Detailed Description of the Preferred and Alternate Embodiments, with reference to the accompanying drawings, of which.

DETAILED DESCRIPTION OF THE PREFERRED EMBODIMENT

Figure 1:
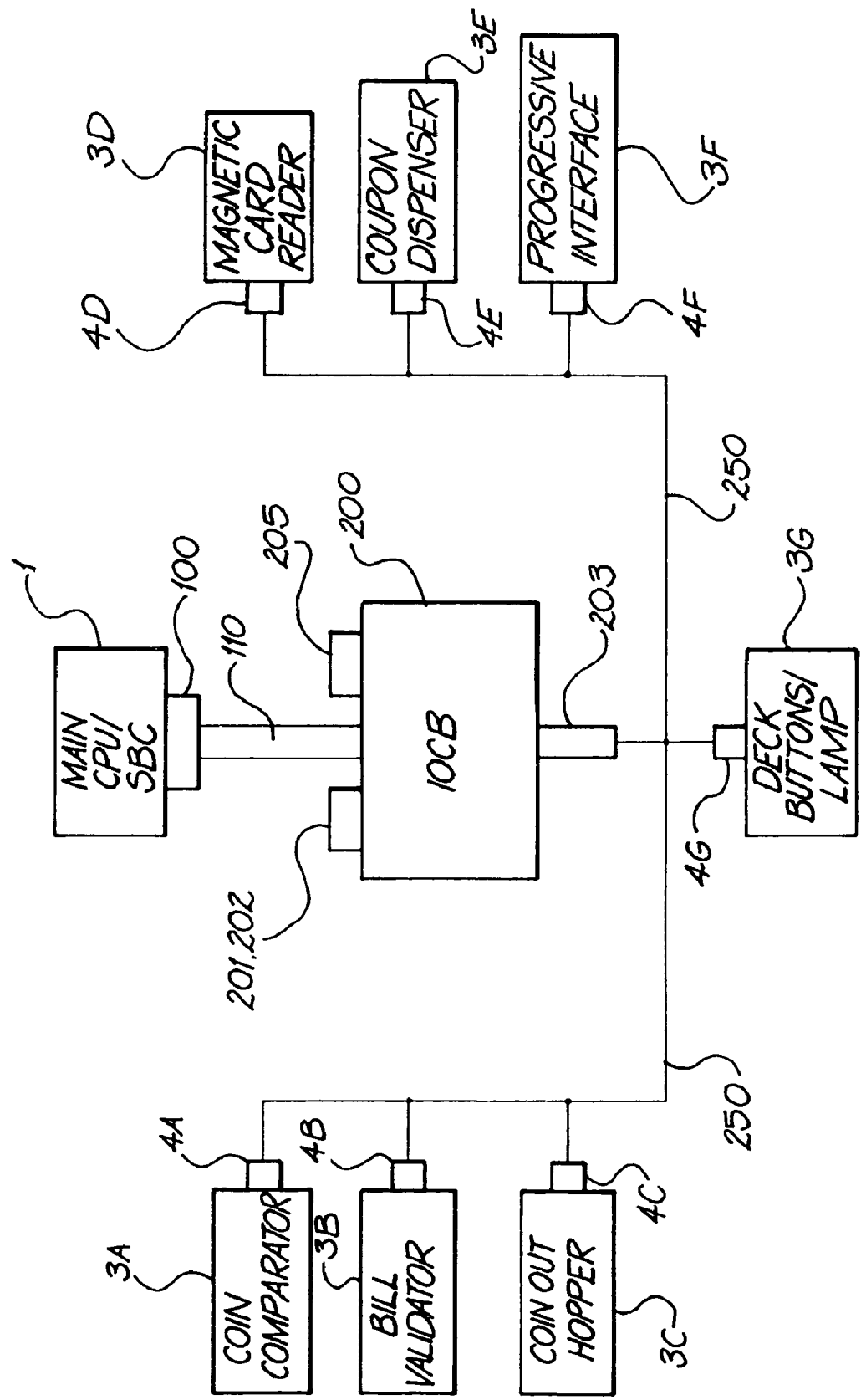
FIG. 1 is one embodiment of the invention showing the SBC of the gaming machine connected to the IOCB and connected to seven devices through device boards in a multi-drop bus configuration.

Referring to the drawings, wherein like numerals reflect like elements throughout the several views, FIG. 1 depicts the SBC (generally 1) of the gaming machine, as connected to the Input/Output Controller Board ("IOCB") (generally 200). The IOCB 200 is connected in a multi-drop bus configuration 250 to the devices (3A, 3B, 3C, 3D, 3E, 3F, 3G), each device with its own microprocessor inclusive board (respectively, 4A, 4B, 4C, 4D), 4E, 4F, 4G). The devices depicted are a coin comparator 3A, a bill validator coupon 3B, a coin out hopper 3C, a magnetic card reader 3D, a coupon dispenser 3E, a progressive interface 3F, and a deck buttons/lamps 3G. Each device (3A through 3G) has its own board (4A through 4G) (the "Device Boards") and is virtually connected to the SBC I and to the other devices through the multi-drop bus configuration 250.

Single Board Computer (SBC):

The SBC 1 is capable of digital storage, contains a microprocessor, preferably a Pentium II, and preferably contains sound and video capability, wave file capability, networking capability, and modem connections.

Input/Output Controller Board (IOCB):

The IOCB 200 is a Microprocessor based electronic board featuring a microprocessor, preferably a PIC 17C756, preferably on-board Random Access Memory (RAM), preferably Non-Volatile RAM, preferably timer/counters, preferably Capture/Compare/PWM modules, preferably two 8-bit parallel ports (Parallel Slave Port (PSP) Data 201, PSP Control 202), preferably one Serial Communications Interface, preferably two-wire Inter-Integrated Circuit (I²C) bus 203, preferably internal/external Interrupt sources, preferably a Watchdog Timer, preferably a Brownout detection and preferably Programmable code-protection. The IOCB 200 has the ability to set up and communicate in the communications protocol standard, to communication with at least one device, and to perform distributed processing.

Device Microprocessor Board Hardware:

Attached to each device 3A through 3G in the gaming machine is a Microprocessor based electronic CPU board (the "Device Board.") 4A through 4G. Each board is specifically designed and programmed to interface with the specific function of its associated device. The devices are connected to the IOCB 200 in a multi-drop configuration 250. Each board is capable of communicating in a communications protocol, preferably an Inter-Integrated Circuit (I²C) communications protocol, and contains a microprocessor, preferably a PIC 16C67. Integrated components of the board (size of RAM, high current output drivers, etc.) are application specific. Each board 4A, 4B, 4C, 4D, 4E, 4F, 4G contains a memory component, preferably a 64-bit serialized memory component, which is used as another security check in the design. The unique serial number of each component of each Device Board is installed into the board at time of production and provides a unique identification number for each board (the "Board"). The Board ID is used in the packet transmissions to and from the IOCB 200 as another signature verification in the calculation of the CRC-16.

Figure 2:
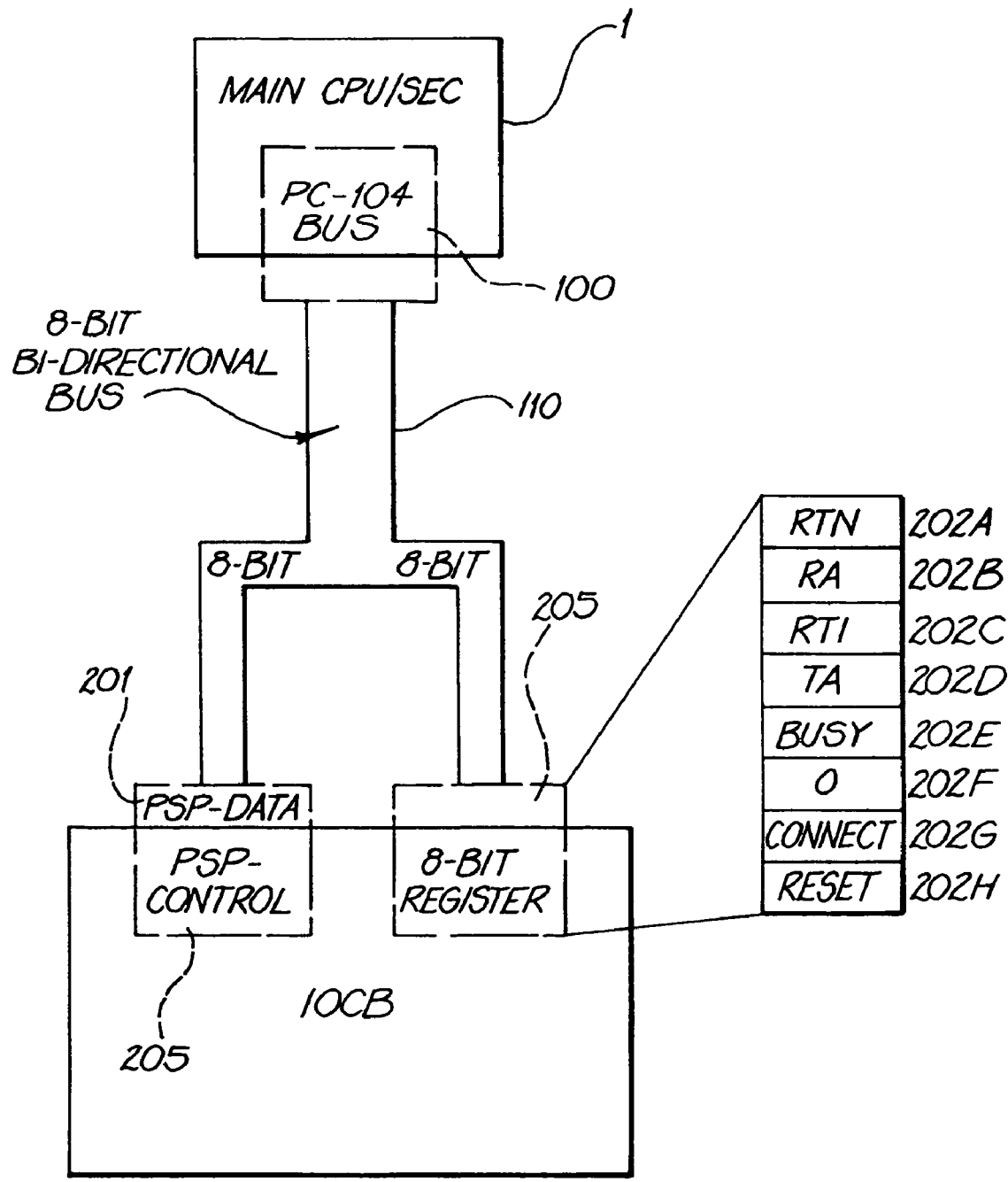
FIG. 2 is an embodiment of the invention, showing the preferred PC-104 bus of the SBC connected through a preferred parallel interface by an 8-bit bi-directional bus to two parallel slave ports (PSP-Data and Control, and the 8-bit register) of the IOCB.

FIG. 2 depicts the preferred PC-104 port 100 of the SBC 1 connected by preferably an 8 bit bi-directional bus to preferably the IOCB's PSP-Data 201 and PSP-Control 202 port and to the IOCB's 8-bit register. Communication to and from the SBC 1 is accomplished through the IOCB's 8-bit PSP Data and PSP-Control port 201, 202 and the SBC's PC-104 bus 100 and the bi-directional interrupt driven data transfers utilise a shared 8-bit register 205 which regulates data direction and flow control. Depending on its specific task, the IOCB 200 will set and reset the handshaking control bits, with the SBC 1 to monitor these status bits.

Each bit of the 8 bit register 205 preferably is populated as follows:

| bit | | | | | | | |
|---|---|---|---|---|---|---|---|
| 7 | 6 | 5 | 4 | 3 | 2 | 1 | 0 |
| RTR | RA | RTT | TA | CONNECT | 0 | ZERO | RESET |

Bit 7—Ready To Receive (RTR) 202A preferably indicates, if set, that the IOCB 200 is ready to receive a data byte. If the SBC 1 has a character to send, it reads this statusbit and if set, will send the character. If reset, a time-out interval is initiated and if it expires, the SBC will report an error which locks up the game.

Bit 6—Receive Aborted (RA) 202B preferably indicates, if set, that the IOCB has detected a communication error while receiving data. The SBC 1 also monitors bit 6 prior to sending a character, and if Bit 6 is set, the SBC 1, will abort the balance of the transmission and retry again.

Bit 5—Ready To Transmit (RTT) 202C preferably indicates, if set, that the IOCB 200 has data to send. When set, this bit asserts Interrupt Request 11 (IRQ1 1) on the SBC 1. Once the interrupt has been serviced and the character has been read, the IOCB 200 notifies its PSP hardware 201, 202 and resets this bit. The IOCB 200 then generates a Transmit Data Register Empty interrupt, signalling that another character may be sent.

Bit 4—Transmit Abort (TA) 202D preferably indicates, if set, that the IOCB 200 has detected an internal transmission error while transmitting a packet to the SBC 1 and that no more data will be sent. If the SBC 1 detects that this bit is set, it will clear any previous characters received and abort the receive process.

Bit 3—Busy 202E preferably indicates, if set, that the IOCB 200 is busy processing a critical application and prevents the SBC 1 from an erroneous time-out on a data transfer. The IOCB 200 sets this bit upon entering a critical application, resetting it upon completion. The SBC 1 will initiate a longer time-out interval, but upon expiration, will report an error locking up the game.

Bit 2—0 202F This bit is reserved for future use.

Bit 1—Connect 202G preferably indicates, if set, that the handshaking flags of this register should be ignored. The IOCB 200 sets this bit to the value 1 (indicating high impedance) if the IOCB 200 and SBC 1 are disconnected, as the tri-state inputs of the PSP hardware will be high, The IOCB 200 sets this bit to the value 0 if the IOCB 200 and SBC 1 are connected These tri-state inputs (high, low, high-impedance) prevent interference between multiple devices attempting to access the line and allow the IOCB 200 to act as a traffic controller. The IOCB 200 always resets the bit to prevent erroneous actions based on bit levels being set.

Bit 0—Reset 202H preferably indicates to the SBC 1, if set, that the IOCB 200 has been up or reset, alerting the SBC 1 to set the 'state' of the gaming devices in the machine. That bit is reset each time initial communications are established between the IOCB 200 and the SBC 1.

Figure 3:
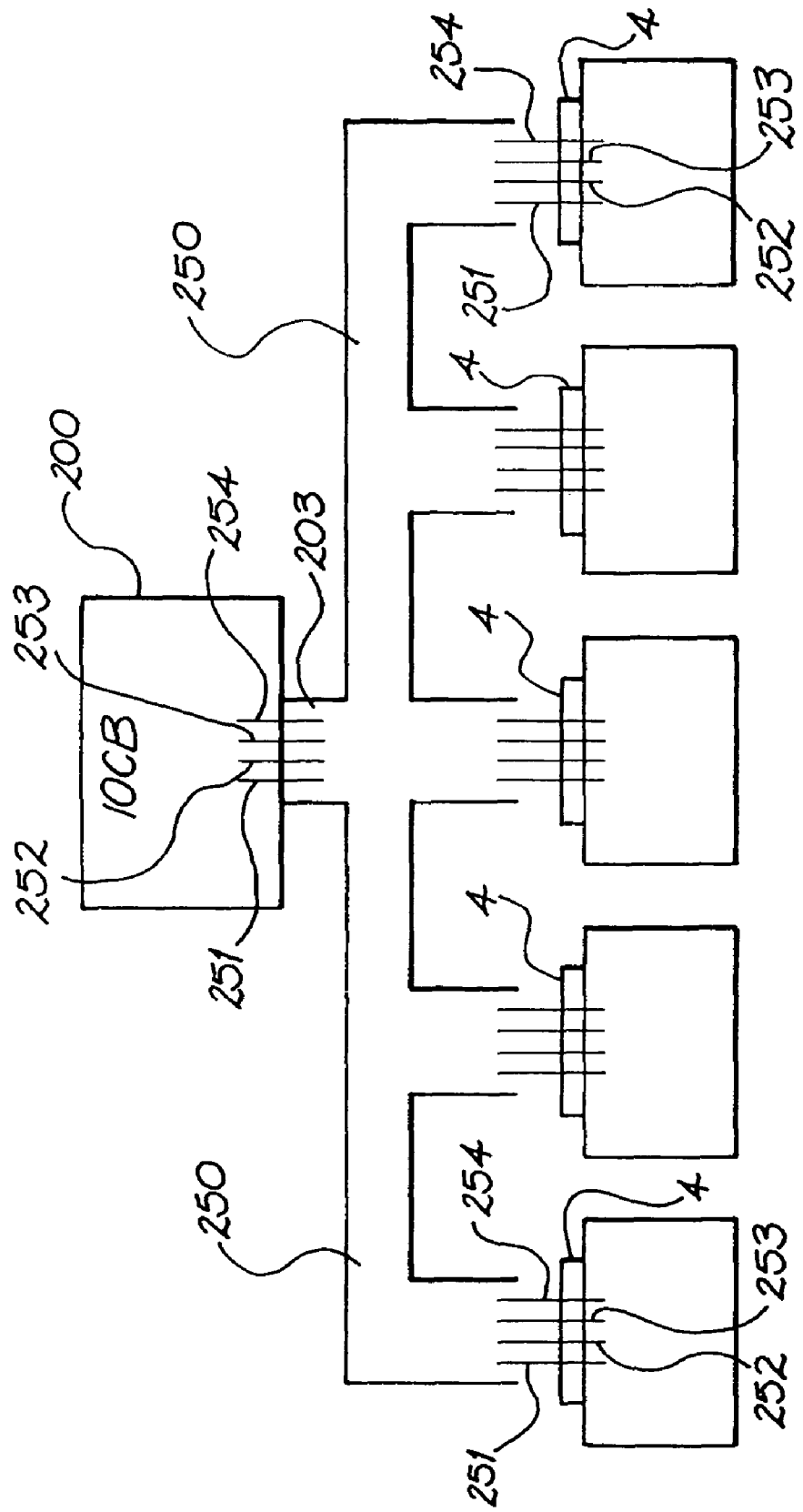
FIG. 3 is a preferred embodiment of the invention, showing the IOCB connected in a multidrop configuration with four wires to five devices.

FIG. 3 depicts the interconnections among the IOCB 200 and five devices 3 in the preferred I²C multi-drop configuration 250. The IOCB's I²C port 203 is connected to each Device Board 4 through preferably a four-wire multi-drop bus 250. The preferred I²C capable multi-drop bus 203 has preferably four wires (clock 251, data 252, Logic Power 253 and System Ground 254) which are distributed through the machine, providing the Device Boards 4 with a means to utilise the clock, data, power and a ground of the IOCB 200. Each device 3 is equipped with a Microprocessor based electronic circuit board 4 (the "Device Board") which is specifically designed to interface with the device's input or output signals depending on the device. The Device Boards 4 are capable of communicating using network-capable communications protocols, preferably Inter-Integrated Circuit (I²C) protocols, enabling interconnection among the devices 3. In the preferred I²C multi-drop bus 250, clock 251, data 252, Logic Power 253 and System Ground 254 are distributed in each device providing a clock, data transmission, power and ground to the Device Boards 4. A Device Board 4 can be attached to more than one Device 3. In that event, more than one device will have a single communications protocol address (preferably an I²C address), but each device will have a unique Virtual ID.

Figure 4A:
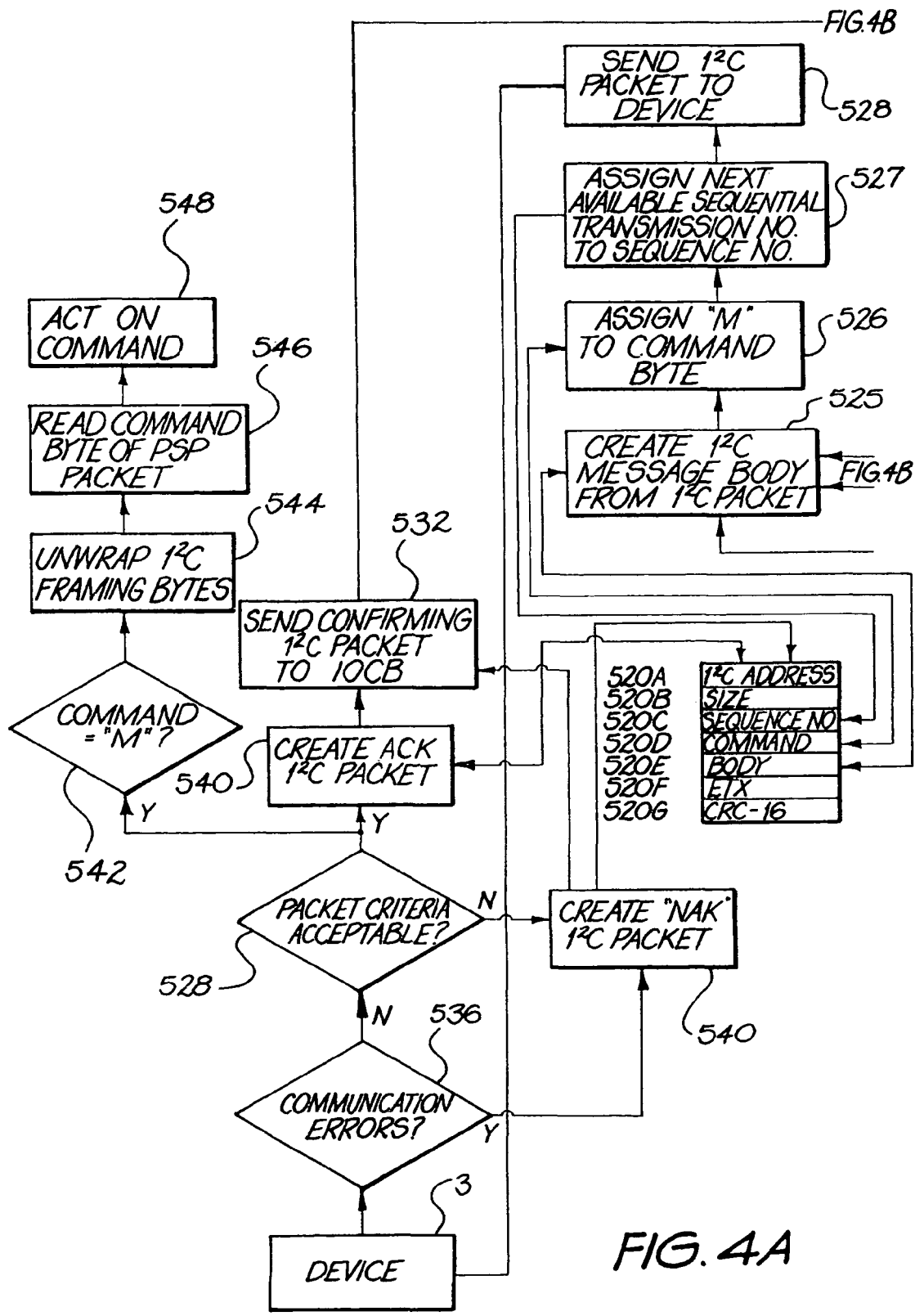
FIG. 4 is a flow chart showing the transmission of data from the SBC to the devices through the IOCB.
Figure 4B:
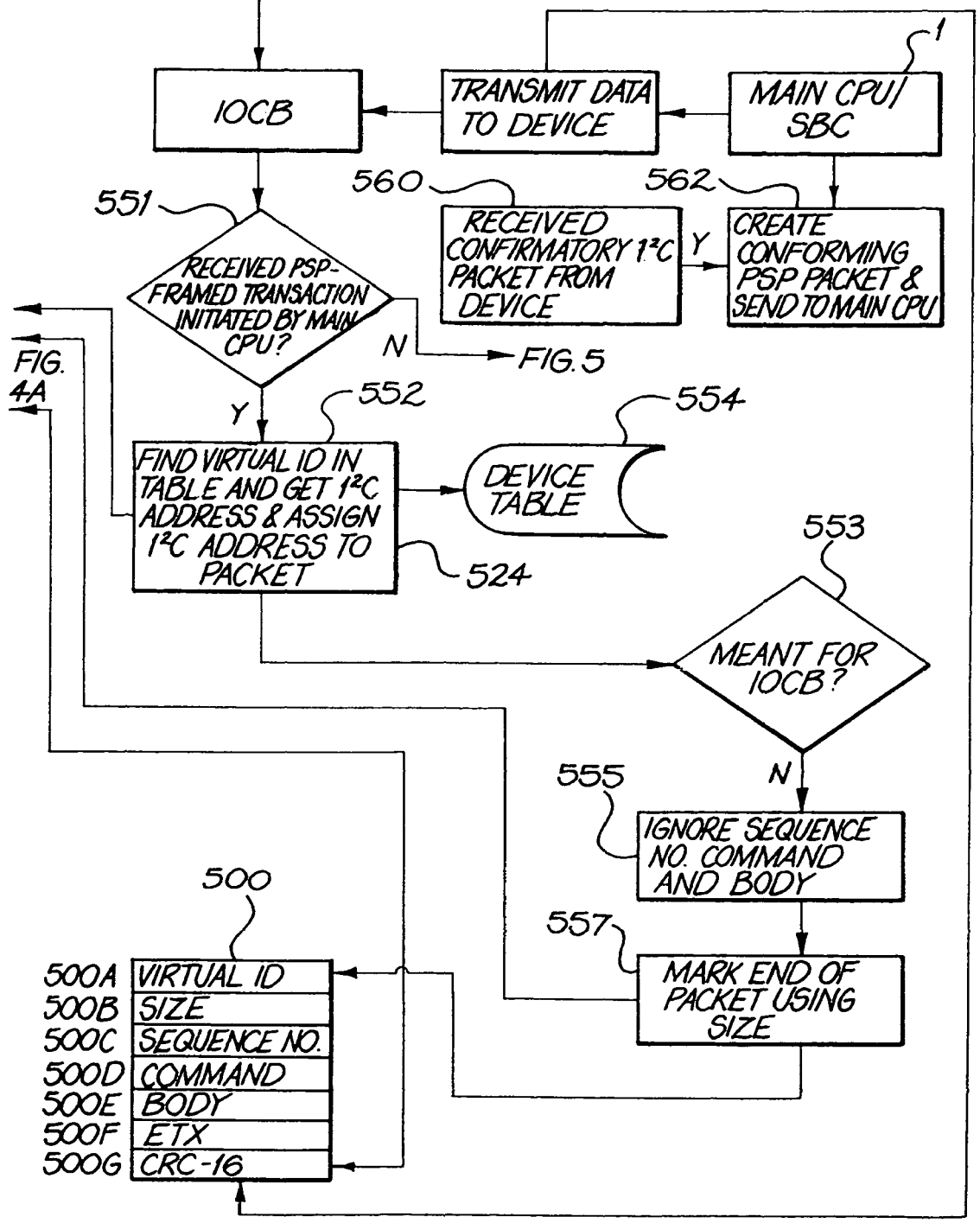

FIG. 4 depicts data transfers of SBC-initiated transmissions between the devices 3 and the SBC 1 through the IOCB 200. Data transfers between the IOCB 200 and the SBC 1 are based on a PSP framed packet 500 with the preferably following protocol:

[Virtual D] [size] [sequence #] [Command] [ . . . body . . . ] [ETX] [CRC-16]

Virtual ID 500A: this byte preferably contains a circuit number or reference number by the SBC 1 determines which device-specific software driver is used to interpret a message received from the device 3 or to generate the particular data sent to the device 3.

Size 500B: this byte preferably contains the character length of the PSP framed packet from Virtual ID 500A to the CRC-16 500G inclusive.

Sequence 500C: this byte preferably contains the message sender's next sequential number. The message receiver maintains an expected sequential reception number corresponding to the message sender's Virtual ID. This sequence number is initiated to a 0 value and is incremented by 1 for each successful transmission, wrapping at the value of 255 back to a value of 1. The value of 0 is only used on initial setup, and if the value is 0, the message receiver resets its expected sequence number. The sequence number provides additional security to ensure that all transmissions are received (see FIG. 6). If the message receiver has accepted the valid transaction (all packet criteria has been satisfied), this constitutes a successful transmission and the message receiver responds to the message sender by transmitting an acknowledge (ACK) packet which will cause the message sender and receiver to increment their sequence numbers.

Command 500D: this byte preferably informs the message receiver what to do with the (if any) in the body of the message. For example, if this bytes contains "ACK", this acknowledges the message sender's last received packet and contain 0 bytes in the body of the message. Similarly, the IOCB 200 sends a Link Request command (with 0 bytes) to the SBC 1 on power-up, which requests a communication link. In an additional example, a Bill Acceptor transaction with a command of 'B' signifies that the Bill Denomination is in the message body and contains four bytes in the body of the message. "ACK" has the hexadecimal value of 06, indicating a positive acknowledgment. "NAK" has the hexadecimal value of 15, indicating a negative acknowledgment.

Body 500E: this byte preferably contains a variable number of bytes from 0 to 248, contains pertinent data regarding the transaction. For example, this field may contain the denomination of the bill accepted, the coin denomination, or the Player's Account Number processed by the Magnetic Card Reader. The actual specific data contained are determined by the Virtual ID involved.

ETX 500F: this End of Transmission (ETX) byte is preferably used for packet. ETX has a hexadecimal value of 04, signalling End of the Transmission.

CRC-16 500G: this two-byte field preferably is a 16-bit Cyclic Redundancy Check (CRC) value, used for packet validation and security. The CRC-16 value is generated using a 16-bit reverse polynomial-based algorithm performed on each transmitted/received byte. This 16-bit value is initially set to 0 and each byte of each Device Board 4 and the device type byte (Coin Mechanism, Bill Acceptor, etc.) is cyclic redundancy checked (CRC'd). The resultant 16-bit value, called the 'seed', is used as the initial value prior to applying the CRC algorithm to each byte in the packet. A CRC value is generated for each packet and includes the entire packet, from Virtual ID to ETX inclusive. A packet's CRC value is compared to the device's 3 seed and should be equivalent if the packet has been successfully transmitted. The CRC-16 'seeding' is applied to all transactions except the 'R'egister Command, which is used when a device 3 is being registered for inclusion in the device table (see FIG. 7). With the Register command, the receiver does not have any knowledge of the Board ID or the type of device registering in the communication packet, the seed is assumed to be 0. In the examples, the CRC-16 value of 'OxCCCC' is used for reference only. The actual 16-bit value would vary depending on the data bytes in the packet.

Communication packets transferred between the SBC 1 and the IOCB 200 (PSP framed packets 500) preferably have a Virtual ID 500A embedded in the packet which is used to steer the transaction to the appropriate software driver of the appropriate device. Communication packets transferred between the IOCB 200 and the device 3 (preferably I²C framed packets 520) preferably use an I²C address 520A to steer the transaction. The IOCB 200 directs transactions both between the IOCB 200 and the SBC 1 and between the IOCB 200 and the devices 3. Due to its dual function, the IOCB 200 must wrap 524, 525,526, 527 the SBC-generated PSP packet 500 with preferably I²C framing 520 prior to sending 528 the packet to a device. Likewise, it must unwrap (FIG. 5, 616) the preferably I²C frame 520 from the device generated PSP packet 500 prior to sending the packet to the SBC 1.

Each Device Board 4 may have more than one physical device attached to it. For example, a Device Board 4 may be attached to two hoppers, one to dispense coins, the other to dispense tokens. As a Device Board 4 has only one communications protocol address, preferably the I²C address 520A, but two Virtual IDs 500A, the IOCB 200 checks 552 its device table 552 for two table entries with the 1 same I²C address 520A. Utilising both the PSP and the I²C framed protocols, the IOCB 200 directs 528 both SBC 1 generated commands (in our example, 'C' & 'T') to the same I²C address 520A. The Device 3 at that I²C address 520A will unwrap 544 the I²C framing bytes and act on 546, 548 the PSP Virtual ID's Command byte 500D and message body 500E.

The following example further illustrates the process by which the IOCB 200 wraps a PSP framed packet 500. The SBC 1 wants to turn on Deck Lamp #4 with the device's Virtual ID of 126, the sender's next sequential transmission number of 56, and the command byte of 'L'. Using the following PSP packet format 500 and values:

| [Virtual ID] | [size] | [sequence #] | [Command] | [body] | [ETX] | [CRC-16] |
|---|---|---|---|---|---|---|
| [126] | [8] | [56] | [L] | [0x04] | [ETX] | [0xCCCC] |

The PSP packet 500 will contain the above listed data. Assuming there are no communication errors and the packet criteria is acceptable (see FIG. 6), the IOCB 200 references its device table 554, finds this Virtual ID value 126 at I²C address value 32. By these values, the IOCB 200 determines 551 that the data packet 500 initiated from the SBC 1, determines 553 that the received data packet is not intended for the IOCB 200 and thereby ignores 555 the sequence number 500C, the Command 500D and the body 500E of this packet. The IOCB 200 uses the size byte 500B only to count down the received bytes, i.e. mark the end of the packet 557.

The IOCB 200 then wraps this packet with its own I²C frame. The IOCB 200 first creates 525 the message body 520E of an I2C packet 520 from the PSP packet 500. The IOCB 200 assigns the value of "M" 526 to the Command byte 520D in the I²C packet 520 signifying that the SBC 1 originated this transaction. The IOCB 200 then assigns 527 the next available sequential transmission number from the IOCB 200 to the sequence number 520C for this I²C address 520A. The I²C packet 520 is assigned the I²C address 520A of 32 (524). In the example, the I²C packet is populated as follows:

| [I²C Address] | [size] | [sequence #] | [Command] | [ . . . body . . . ] | [ETX] | [CRC-16] |
|---|---|---|---|---|---|---|
| [32] | [15] | [143] | [M] | [PSP pkt] | [ETX] | [0xCCCC] |

The IOCB 200 then sends 528 the I²C packet 520 to the device 3. Assuming there are no communication errors and the packet criteria is acceptable 536, 538, the device 3 sends an I²C framed packet 520 to the IOCB 200 acknowledging (ACK) its transmission 532. Upon receiving the acknowledgment 560, the IOCB 200 creates and sends 560 a PSP-framed packet 500 to the SBC 1 acknowledging the Virtual ID has accepted its transaction.

If the I²C Command byte 520D of 'M' indicates the SBC 1 originated this transaction 542, as opposed to the IOCB 200, the I²C body 500F contains the PSP packet 500 sent by the SBC 1. The device 3 at this I²C address unwraps the I²C framing bytes 544, reads 546 the PSP framed packet Command ('L' in our example) and acts on 548 the Command by turning on Lamp #4.

Figure 5A:
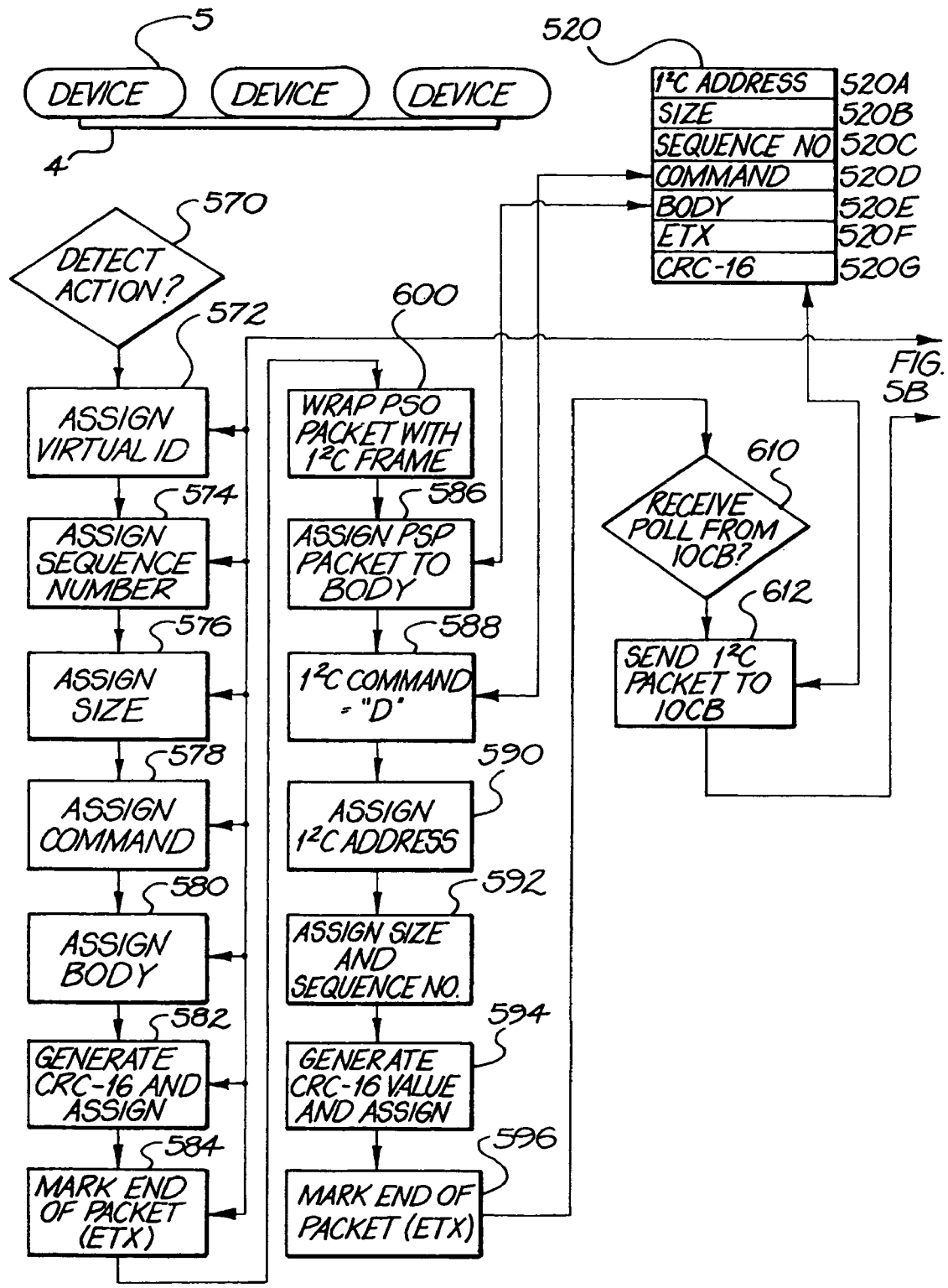
FIG. 5 is a flowchart showing the transmission of data from the devices to the SBC through the IOCB.

FIG. 5 depicts data transfers for device-initiated transmissions among the devices 3 and the SBC 1 through the IOCB 200. The communications protocol framed packet, preferably the I²C framed packet 520, is transferred between the IOCB 200 and the device 3. Each preferred I²C framed packet is comprised of the following parameters.

| I²C Address 520A | Range 9 to 76 h, 0 reserved for Broadcast Address, 1–7 reserved for I²C implementation, 8 reserved for the IOCB Address, 77 h reserved for unregistered devices. |
|---|---|
| Header 520B, 520C, 520D | Packet Size, Sequence Number, Command (each one byte). |

The "ACK" value for Command has a hexadecimal value of 06, indicating a successful transmission, and the "NAK" value for Command has a hexadecimal value of 15, indicating an unsuccessful transmission.

| Body 520E | Up to 248 bytes of binary data. |
|---|---|
| Footer 520F, 520G | ETX, CRC-16 (2 byte Cyclic Redundancy Check). |

For example, a Device Board 4 has three devices 3 attached to it: Deck buttons, Deck lamps, and a Coin-in Mechanism. Each of these devices 3 is assigned its own Virtual ID 500A but the Device Board 4 only possesses one I²C address 520A. In the example, the Coin-in Mechanism's Virtual ID is 41, the Deck button's Virtual ID is 14, and the Deck lamp's Virtual ID is 126. The I²C address 520A is 39.

Assume a coin has been inserted in the gaming machine. The Device Board 4 detects this Coin-in action and, using the Coin-In Mechanism's Virtual ID 500A of 41, sequence number 500C of 214, Command 500D of 'I', and the coin value 500E of 25 (hex 19), the device 3 generates 572, 574, 576, 578 the following PSP packet 500 with the following values:

| [Virtual ID] | [size] | [sequence #] | [Command] | [ ... body ... ] | [ETX] | [CRC-16] |
|---|---|---|---|---|---|---|
| [41] | [9] | [214] | [,I,] | [0x0019] | [ETX] | [0xCCCC] |

The PSP packet 500 is intended for the SBC 1, and, accordingly, the PSP Packet 500 must be encapsulated within an I$^2$C packet for delivery to the IOCB 200 to be delivered to the SBC 1. The PSP packet 500 becomes the body 520E of the I$^2$C packet 520 (586), for which the additional following value are assigned 586, 588, 590, 592, 594, 596 to the I$^2$C packet 520: the IOCB's hard-coded I$^2$C address 520A of 8, a sequence number 520C of 79, an I$^2$C Command 520D of 'D' signifying "Device" originated, creating the following I$^2$C packet 520:

| [I$^2$C Address] | [size] | [sequence #] | [Command] | [ ... body ... ] | [ETX] | [CRC-16] |
|---|---|---|---|---|---|---|
| [8] | [16] | [79] | [D] | [PSP pkt] | [ETX] | [0xCCCC] |

The device 3 waits 610 until the next poll received from the IOCB 200 and then sends 612 the I$^2$C packet 520 to the IOCB 200. Once the IOCB 200 receives the packet, it checks the "command" byte 520D of the I$^2$C packet and, if "Command" equals "D" (for device) 614, the IOCB 200 strips 616 the I$^2$C framing characters. The IOCB 200 then sends 618 the PSP packet 500, extracted from the body 520E of the I$^2$C packet 520, to the SBC 1 as:

| [Virtual ID] | [size] | [sequence #] | [Command] | [ ... body ... ] | [ETX] | [CRC-16] |
|---|---|---|---|---|---|---|
| [41] | [9] | [214] | [I] | [0x0019] | [ETX] | [0xCCCC] |

This PSP packet 500 is the original packet generated by the Device 3 (see 572, 574, 576, 578, 580, 582, 584). The SBC 1, upon receiving a coin-in transaction, checks if there are any communication errors 622 and if the packet criteria is acceptable 620 (see FIG. 6). If the packet is okay, the SBC 1 takes appropriate internal action. If the packet has been validly transmitted, the SBC 1 also sends an ACK transaction to the Device 3. First, the SBC 1 generates 624 the following PSP framed packet 500, assigning "Command" 520D the value of "ACK" 626, assigning other values 528, and sends 633 it to the IOCB 200 as:

| [Virtual ID] | [size] | [sequence #] | [Command] | [ ... body ... ] | [ETX] | [CRC-16] |
|---|---|---|---|---|---|---|
| [41] | [7] | [214] | [ACK] | [0 bytes] | [ETX] | [0xCCCC] |

Once again, the IOCB 200 encapsulates 634 this PSP packet 500 with its I²C framing characters, looks up the I²C address 520A associated with the Virtual ID 638, assigns the I²C address 640, assigns the value of "M" to "Command" 520D, creating the following I²C packet 520. The IOCB 200 then sends this I²C packet 520 to the I²C address 520A found in its device table for this Virtual ID 500A:

| [I²C Address] | [size] | [sequence #] | [Command] | [ ... body ... ] | [ETX] | [CRC-16] |
|---|---|---|---|---|---|---|
| [39] | [14] | [79] | ['M'] | [PSP pkt] | [ETX] | [0xCCCC] |

Once the Device Board 4 detects the transmission 644 and ascertains that it was sent from the SBC 1 646, the Device Board 4 at the I²C address 520A strips 648 the I²C framing characters and decodes 650 the PSP packet 500 embedded in the body 520E the I²C packet 520. The ACK Command confirms 652 to the Device 3 that the transaction was accepted by the SBC 1.

If appropriate, the SBC 1 generates another transaction 621 to be sent to the Device 3 responsible for updating the hard meter associated with this coin-in transaction.

Figure 6A:
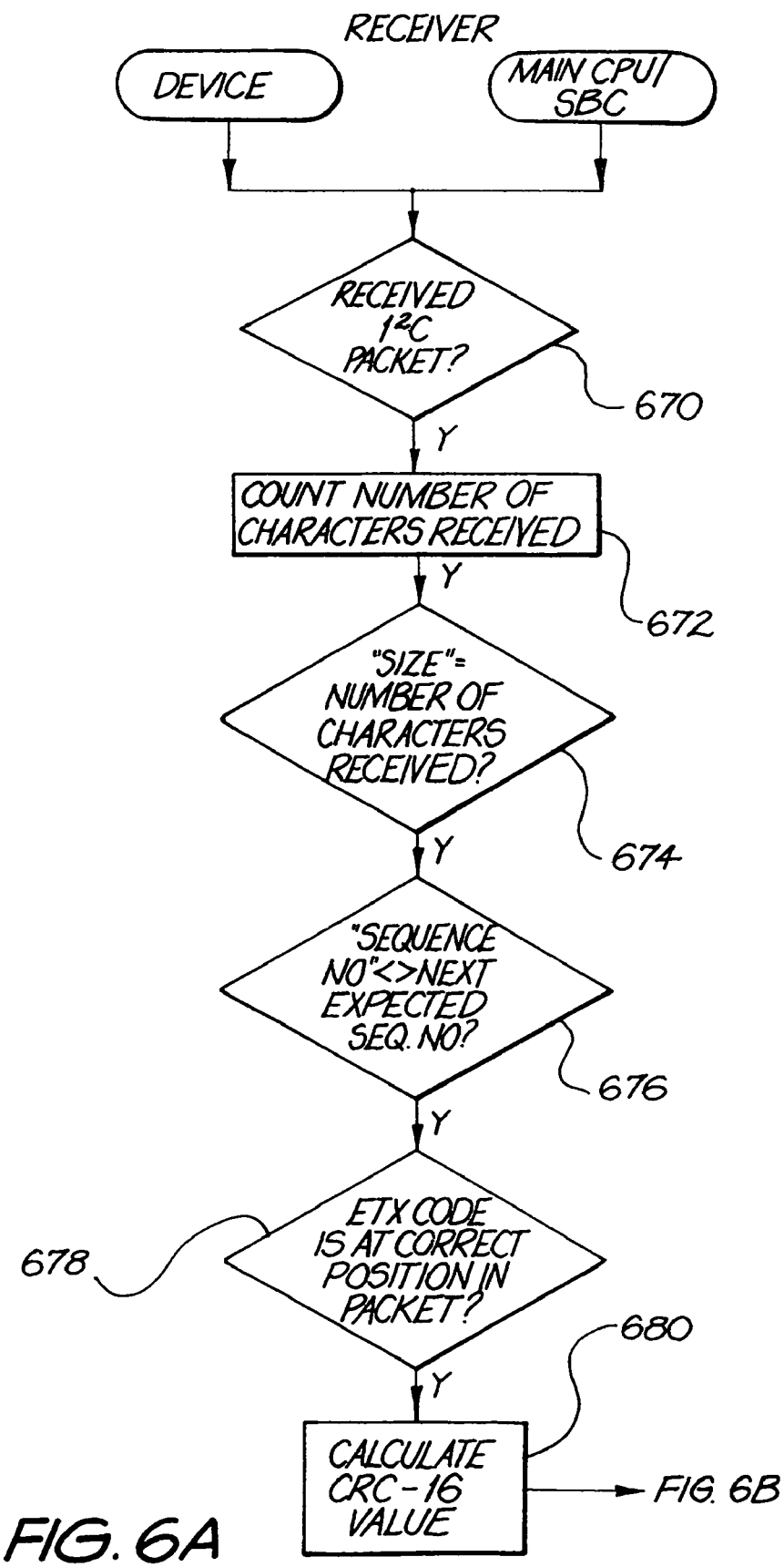
FIG. 6 is a flowchart depicting the four-level security of the invention, which ensures the validity of data transfers.
Figure 6B:
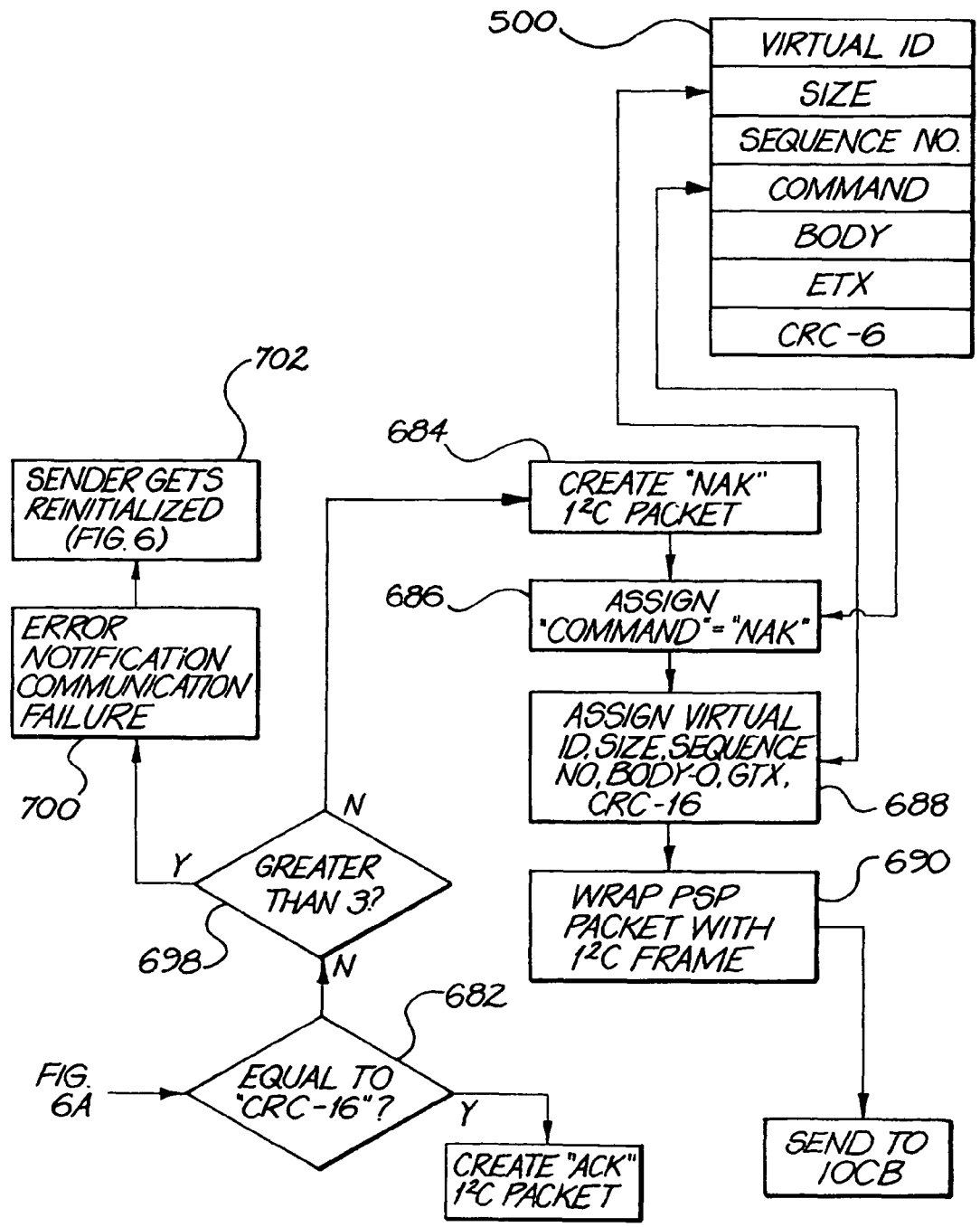

FIG. 6 depicts the preferred security devices of the invention which ensure the validity of the data transmissions. Each time a device 3 or the SBC 1 sends a transmission, upon receipt 670 of the packet, the receiving module (the Receiver) checks the I²C packet 520 received to ensure validity of the received packet. First, the Receiver counts the number of characters received 672 and compares 674 this value to the "size" field of the received packet. If the packet passes this test, the Receiver then checks 676 if the "sequence number" of the received packet equals the receiver's next expected sequence number. If the packet passes this test, the Receiver checks if the ETX code is detected 678 at the correct index in the packet. Lastly, the Receiver calculates 680 the CRC-16 value of the received packet and checks 682 if the 16-bit CRC value received is equal to the calculated 16-bit CRC. If any of these tests fails, this indicates a communication failure and the Receiver creates a NAK packet 684, assigning "Command" a value of "NAK" 686, assigning the other values 688, and wraps 690 the PSP packet to notify the sender that the transmission failed. Upon receipt of the NAK packet, the sender reconstructs the packet and sends it again. If the receiver detects 698 more than three consecutive attempts which result in failure, the appropriate steps of error notification 700 are taken.

Should a transmitted packet fail any validation check, the receiver will send a Negative Acknowledge (NAK) packet 684, 686, 688 to the sender indicating an error. The sender will retry up to three times 698 before declaring a communication failure 700 causing the sender to re-enter the initialization state 702 and attempt to re-establish a communication link (see FIG. 6).

Figure 7A:
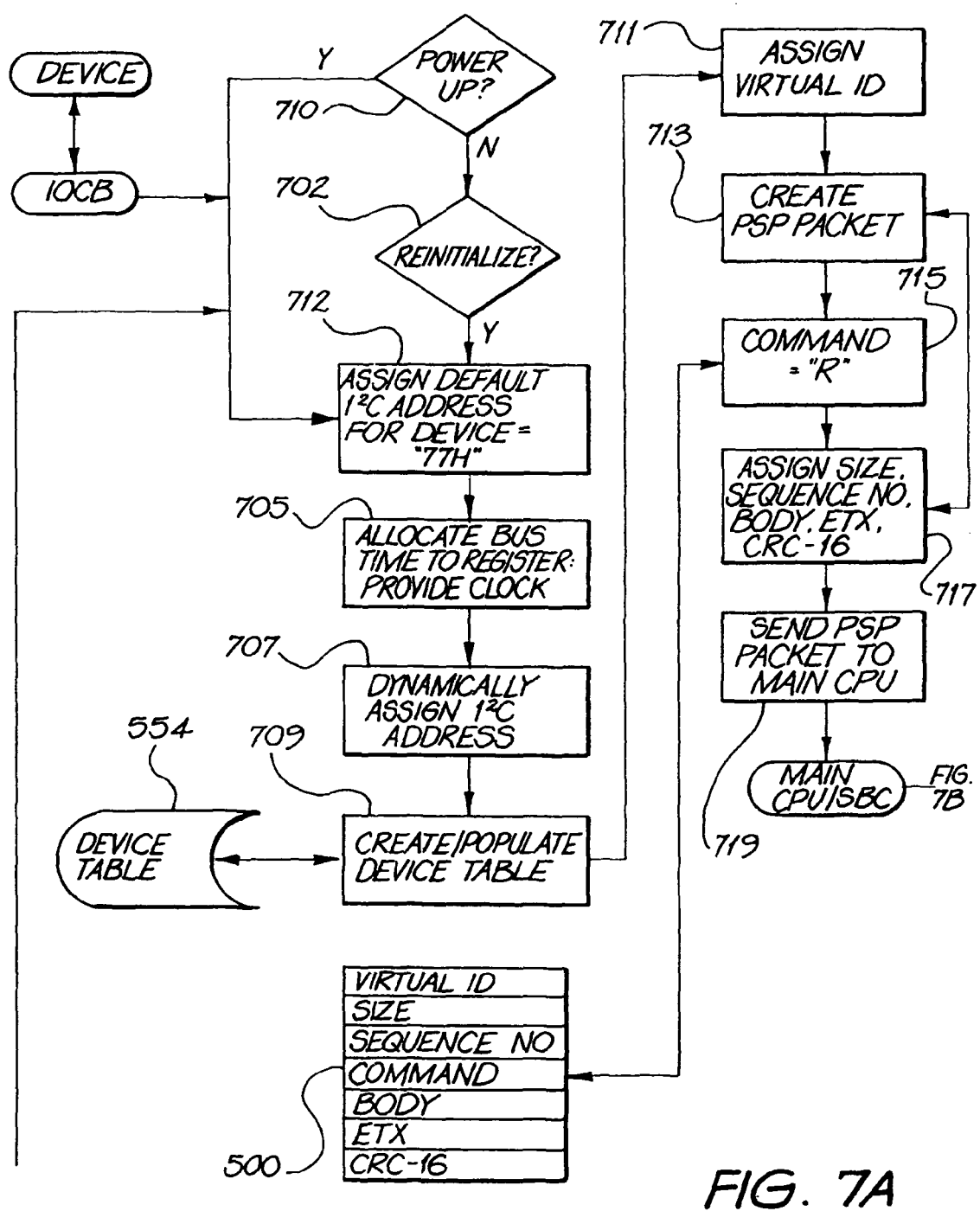
FIG. 7 is a flowchart depicting the registration of devices by the IOCB.
Figure 7B:
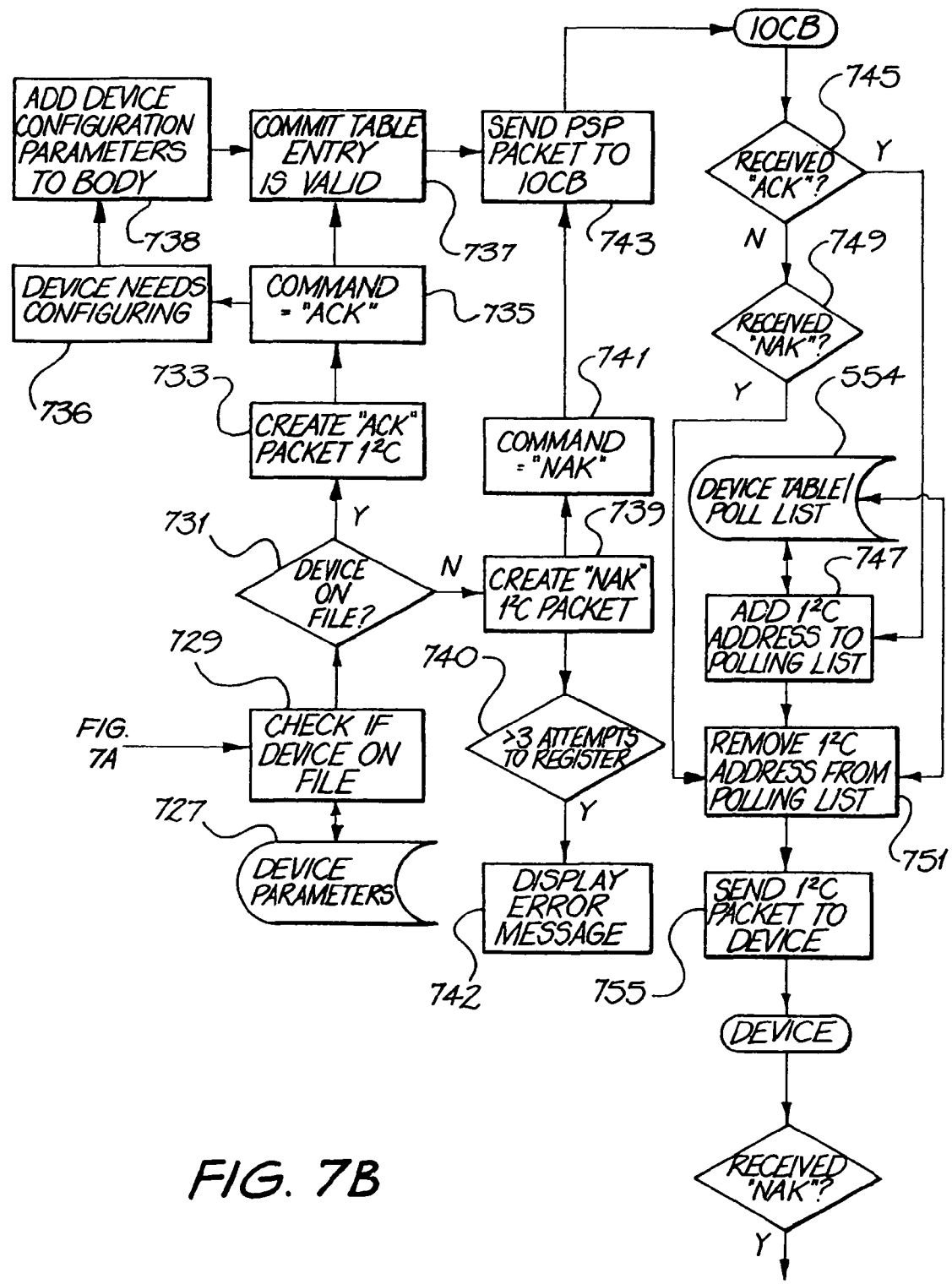

FIG. 7 depicts the preferred device registration by the IOCB 200 of each device. Upon power up 710 or reset 702, the IOCB 200 assigns 712 the same default physical I²C address 520A (77h) to each device 3. If registration of the device is not necessary, the IOCB 200 allocates 705 bus time for each device 3 to register. The IOCB 200 then dynamically assigns an I²C address 707 which is clocked out to the responding slave device. The IOCB 200 sets up 709 a table 554 corresponding to this address and populates 709 the table with the data it has received from this slave device. A Virtual ID 711 is assigned to this device 3 which the SBC 1 will use to invoke a software driver pertaining to this device 3. The IOCB 200 creates 713 a PSP packet 500 (Virtual ID, a 'R'egister Command, and the device particulars 715, 717) and sends 719 the PSP Packet 500 to the SBC 1. The SBC 1 checks 729 if this device is on file 727, creates an ACKnowledging PSP Packet 733 with the value of "ACK" for the "Command" 735, checks if the device 3 needs configuration 736, adds configuration parameters to the "Body" of the packet 738, and sends 743 a Register ACKnowledge command to the IOCB 200 confirming this device is valid and commits the tabled entry as valid 737. Upon receipt of the acknowledgment 745, the IOCB 200 adds 747 this I²C address 520A to its polling list 554. If this particular device 3 needs configuring 736, the SBC 1 embeds 738 the configuration parameters into the message body 500E of the Register ACKnowledge packet sent to the IOCB. The IOCB 200 resends 755 these parameters in the I²C packet sent to the device 3.

If the SBC 1 has no information on this device 731, or this device 3 is not allowed in this machine 731, a Register.NAK command is created 739, 741, and sent 743 to the IOCB 200 signifying registration denial of this device. Upon receiving a "NAK" packet 749, the IOCB 200 re-sends 755 the Register NAK command to the device and removes 751 the device's I²C address 520A in the table list of devices. The Device Board 4 re-initializes 702, re-configures its address as 77h 712, and attempts to register 705. If after three attempts to register has failed 740, the SBC 1 displays an error message 742.

On initial power-up (FIG. 7, 702, 710) or reset, each Device Board 4 is programmed as default I²C address 77h (see FIG. 7) and, upon successful registration, the device's I²C address is added to the poll list 747. The IOCB 200, periodically polls I²C address 77h for any response by following I²C standard protocols. The protocol mandates the IOCB 200 check if any device other than the IOCB 200 is asserting a clock 771. If not, the IOCB 200 sets the clock 773, raises the clock line 777, and, with the data line 252 high, lowers 775 the clock line 251 (start condition) thereby alerting all I²C devices 3 on the bus (Slaves), that the IOCB 200 (Master) is sending an address byte. During registration, the IOCB 200 creates 783, 785, 787 and sends 791 an I²C packet onto the data line. This packet has the address 77h "clocked out" on the data line, i.e., the first seven bits of the I²C address have a value of 77h and the eighth bit signifies either the IOCB's intent to read a byte from this address or write a byte to this address.

The IOCB 200 expects an Acknowledge on the data line 719 (low condition) from a device 3 at this address. The Master will provide 831 the ninth clock for the expected ACK condition. Any devices 3 which do not have I²C address 77h ignore 853 this prompt condition 791, 793. If a device or devices 3 are at this address 795 (there may be several devices with the default value 77h on initial power-up), the device 3 asserts 797, 801 the data line low at the appropriate time to respond to the IOCB 200. If the poll is intended for device registration (it is on initial poll), the Master sets the Read flag 785, 787 intending to read the responding device's registering data.

The I²C protocol mandates a stop condition 833 (a terminating condition for ² each I C transmission) which the Master (IOCB 200 or SBC 1) will provide. Under I²C mode, the Master of the I²C line always provides the clock signal 773, even if a Read condition has been established and thus will read 829 the data as it provides the clock 773 by which the Slave sends the data.

If multiple devices respond 803 to the IOCB's 77h address byte, bus arbitration will come into play. As the IOCB provides each clock pulse 773, the devices will assert 811 their particular data bit onto the data line, but each device will first sample 807, 809 the data line to ensure its level is its intended level. If the level is not at the intended level, the particular device resets its I²C commitment 813 753, and backs out of additional involvement 813 until it receives 815 the next address byte from the IOCB 200. As arbitration may continue for several bytes, the surviving device 3 will have finally completed its registration packet to the IOCB 200.

The IOCB maintains the device table 554 in preferably the following format:

| | |
|---|---|
| Address | Dynamically assigned I²C address. |
| Device Type | Type of device (i.e. Coin mech., Bill acceptor, ). |
| Sub-Type | Specific Make or Model. |
| Serial # | Unique Board Identification Number (Board ID). |
| Status | Last reported status. |
| Priority | Polling priority. |
| Virtual ID | SBC's end to end reference #. |

As the IOCB 200 is continuously polling, the following example will detail a typical poll transaction to the device at I²C address 39. The poll Command 520D 'Q'uery will have 0 bytes in the message body. The IOCB's next sequential transmission number 520C is 79 (the device 3 at this I²C 520A address will be expecting this sequence number to be 79). The IOCB's I²C address 520A is hardcoded at 8.

| [I²C Address] | [size] | [se-quenced] | [Command] | [body] | [EXT] | [CRC-16] |
|---|---|---|---|---|---|---|
| [39] | [7] | [79] | ['Q'] | [0 bytes] | [EXT] | [0xCCCC] |

The IOCB 200, as Master of the I²C bus, will clock out these data bytes to the Device Board 4 at this I²C address 520A. The Write flag is set 789 in the packet's address byte 520A indicating the IOCB 200 is sending data. The device 3 ACKnowledges each byte by asserting 799, 801 the data line at the ACK clock bit time frame. When the IOCB 200 has sent all bytes 819, the Read flag is set 821 in the address byte, and the IOCB 200 re-sends 791 this byte. The IOCB 200, now expecting to receive data, will provide the clock to the Slave, but reads each clocked data line pulse 829 for 1 or 0, capturing 8-bits per byte.

| [I²C Address] | [size] | [se-quenced #] | [Command] | [body] | [EXT] | [CRC-16] |
|---|---|---|---|---|---|---|
| [8] | [7] | [79] | [ACK] | [0 bytes] | [EXT] | [0xCCCC] |

In this read mode, the Master must assert the ACK pulse 831 after each 8-bits 827 to tell the Slave that the Master has received this byte. When the Master has received a number of bytes equal to "size" 823, it does not assert the ACK pulse and generates the stop condition 833 signifying the transfer has completed. The IOCB 200 receiving an ACK Command 825 to the polling Query, states the device is active but has no information to send.

As the IOCB 200 is the only Master on the I²C bus 250, the IOCB 200 detects 771 the clockline asserted by any other device attempting to control the bus 250 during the polling process. After a small time-out 835 in the event there is a possible spike or glitch on the bus, the IOCB 200 retests and, if this condition still exists, the IOCB 200 asserts the clock line low 839 disrupting and prevents any further I²C communications on the bus 250. The IOCB 200 also reports this condition 841 to the SBC 1 for error reporting. After the shut down, the IOCB 200 periodically releases the clock line 843 and retests 845 for the above violation. If a retest shows the clock line is clear 847, the IOCB 200 broadcasts ReRegister Commands 849 to all I²C devices 3 listed in the device table, requiring each to reset and reregister. The IOCB 200 also reports 851 the cleared condition to the SBC 1.

Due to the inherent security built in the preferred I²C protocol, and the internal security checks designed into the IOCB 200 and SBC 1, as described above, it is virtually impossible for an alien device to invade the bus, or for a device to attempt communications with another device without the IOCB's knowledge and subsequent intervention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for allowing a change of one or more attachable peripheral gaming devices in a gaming system having (1) a gaming machine with software, approved by a regulatory agency of at least one jurisdiction under regulatory requirements, and (2) an input/output controller, and allowing the change without modifying the software so that a resubmittal to a regulatory agency would not be necessary, the method comprising:

establishing, for access by said gaming machine, a device table including jurisdictional data identifying a specific parameter of at least one attachable peripheral gaming device so as to indicate via said table an allowable change of the peripheral gaming device as being compliant with jurisdictional requirements;

detecting by said input/output controller an attachment of the peripheral gaming device having jurisdictional data to said gaming system;

determining automatically by said input/output controller said jurisdictional data from the detected peripheral gaming device;

comparing by said game computer the determined said jurisdictional data of the detected peripheral gaming device with said jurisdictional data from said device table; and registering the detected peripheral gaming device if the determined said jurisdictional data corresponds to said jurisdictional data from said device table whereby the change of the peripheral gaming device is considered to be compliant with jurisdictional requirements.

2. The method of claim 1, further comprising creating by said input/output controller a virtual identification for a registered gaming device.

3. The method of claim 2, further comprising establishing by said input/output controller a table associating said virtual identification with said jurisdictional data.

4. The method of claim 1, further comprising denying registration for said detected gaming device when the determined said jurisdictional data does not correspond to said jurisdictional data from said device table.

5. The method of claim 1, wherein said detecting step is performed at a periodic interval.

* * * * *